United States Patent
Floris et al.

(10) Patent No.: US 9,823,421 B2
(45) Date of Patent: Nov. 21, 2017

(54) WAVELENGTH INSENSITIVE EXPANDED BEAM WITH GRIN FIBER

(71) Applicant: Tyco Electronics Nederland BV, 'S-Hertogenbosch (NL)

(72) Inventors: Sander Johannes Floris, Best (NL); Jeroen Antonius Maria Duis, Didam (NL); Jan Willem Rietveld, Benschop (NL); Rutger Wilhelmus Smink, Hamont-Achel (BE)

(73) Assignee: COMMSCOPE ASIA HOLDINGS B.V., Bussum (NL)

( * ) Notice: Subject to any disclaimer, the term of this patent is extended or adjusted under 35 U.S.C. 154(b) by 428 days.

(21) Appl. No.: 13/826,473

(22) Filed: Mar. 14, 2013

(65) Prior Publication Data
US 2013/0272655 A1 Oct. 17, 2013

Related U.S. Application Data (60) Provisional application No. 61/622,801, filed on Apr. 11, 2012.

(51) Int. Cl.
*G02B 6/32* (2006.01)
(52) U.S. Cl.
CPC ........... *G02B 6/32* (2013.01); *Y10T 29/49826* (2015.01)
(58) Field of Classification Search
CPC ...................................................... G02B 6/32
See application file for complete search history.

(56) References Cited

U.S. PATENT DOCUMENTS

| | | | |
|---|---|---|---|
| 4,360,249 A | 11/1982 | Slemon | |
| 5,680,237 A * | 10/1997 | Cheng | G02B 6/2937 385/34 |
| 5,689,374 A | 11/1997 | Xu et al. | |
| 6,542,665 B2 * | 4/2003 | Reed | A61B 5/0084 359/652 |
| 6,839,483 B2 | 1/2005 | Reed et al. | |

(Continued)

FOREIGN PATENT DOCUMENTS

| | | |
|---|---|---|
| EP | 0 370 663 A2 | 11/1989 |
| EP | 1 845 398 A1 | 10/2007 |

OTHER PUBLICATIONS

International Search Report and Written Opinion for PCT/EP2013/057310 dated Jun. 28, 2013.

(Continued)

*Primary Examiner* — Daniel Petkovsek
(74) *Attorney, Agent, or Firm* — Merchant & Gould P.C.

(57) ABSTRACT

A GRIN fiber lens connection system particularly suited for high-power laser applications is disclosed. In one aspect, a GRIN fiber lens expanded beam system that is efficient over a wide spectral region, e.g., a range of about 200 nm, 300 nm or 400 nm, is disclosed for coupling one optical fiber (such as a single-mode fiber) to another. For example, a GRIN fiber lens expanded beam system is efficient over a range of wavelengths from about 400 nm to about 800 nm, from about 190 nm to about 390 nm, or from about 1270 nm to about 1650 nm. A method for designing such a coupling system is also disclosed. In another example, the cores of the GRIN fiber lenses are substantially devoid of germanium, and the cladding is doped with an element, such as fluorine, that lowers the refractive index of the cladding.

20 Claims, 13 Drawing Sheets

(56) References Cited

U.S. PATENT DOCUMENTS

| | | | |
|---|---|---|---|
| 6,847,770 B2* | 1/2005 | Kittaka et al. | 385/124 |
| 6,990,271 B2 | 1/2006 | Gafsi et al. | |
| 7,031,567 B2 | 4/2006 | Grinderslev et al. | |
| 7,164,818 B2* | 1/2007 | Bryan et al. | 385/33 |
| 2009/0274428 A1 | 11/2009 | Chen et al. | |
| 2010/0061410 A1 | 3/2010 | Platonov et al. | |

OTHER PUBLICATIONS

Suzuki, T. et al., "Compact, Low-Dispersion Coupling Between Silicagrin® Lensed Fiber and Nonlinear Optical Waveguide," *17th Microoptics Conference (MOC'11)*, Sendai, Japan, 2 pages (Oct. 30-Nov. 2, 2011).

* cited by examiner

WAVELENGTH INSENSITIVE EXPANDED BEAM WITH GRIN FIBER

The present application claims the benefit of U.S. Provisional Application No. 61/622,801, filed Apr. 11, 2012, which is incorporated herein by reference.

INTRODUCTION

This disclosure relates generally to interconnections between optical fibers and more specifically relates to using graded-index (GRIN) fiber lenses to make optical fibers connections having a high bandwidth and suitable of high-power applications.

Optical fibers find a wide range of applications, from high-speed data communication systems to surgical devices employing high-power lasers. Optical connectors are often needed in fiber-optical systems to serve such purposes as splicing optical cables and attaching a variety of laser tools to optical cables. There is a continuing need to provide high-efficiency optical connectors to minimize power loss in optical transmission. Conventional optical connectors, especially those for high-power laser applications, have either not been designed to minimize loss due to chromatic dispersion for wide-spectrum beams or impose extremely stringent requirements on the lens material.

The present disclosure discloses a GRIN-lens-based connection for coupling optical fibers and methodology for designing such a connection.

SUMMARY

This disclosure presents a GRIN fiber lens connection system particularly suited for high-power laser applications. In one aspect, a GRIN fiber lens expanded beam system that is efficient over a wide spectral region, e.g., a range of about 200 nm, 300 nm or 400 nm, is disclosed for coupling one optical fiber (such as a single-mode fiber) to another. In one example, a GRIN fiber lens expanded beam system is efficient over a range of wavelengths from about 400 nm to about 800 nm. In another example, the wavelengths range from about 190 nm to about 390 nm. In a further example, the wavelengths range from about 1270 nm to about 1650 nm.

In an exemplary method for designing such a coupling system, based on a relationship which incorporates the wavelength dependency of a parabolic refractive index profile derived from, for example, the Sellmeier equation, the cladding doping concentration can be optimized such that the difference in the ½-pitch of the GRIN fiber lens at two or more wavelengths within the desired wavelength range is minimized. The relationship so derived enables the establishment of cladding doping concentration levels such that the core refractive index has a substantially fixed relation to the cladding refractive index as function of wavelength.

In an illustrative example in the present disclosure, the cores of the GRIN fiber lenses are substantially devoid of germanium, which is detrimental to the transmission of light in the UV wavelength range. Instead, the cladding of the GRIN fiber lenses is doped with an element, such as fluorine, that lowers the refractive index of the cladding. The doping level of the element (e.g., fluorine) can be chosen such that the half-pitch length, $z_p$, for at least two predetermined wavelengths are the same.

The design methodology presented in the examples in the present disclosure allows for optimizing wavelength independent GRIN fiber lens within the constraints of the materials used to make the fiber.

BRIEF DESCRIPTION OF THE DRAWINGS

FIG. 2 shows (a) an illustrative plot of mode field radius as a function of the position along the optical axis of the GRIN fiber lenses in a typical conventional expanded beam connection system and (b) an enlarged portion of the plot in (a).

FIG. 3 shows (a) an illustrative plot of mode field radius as a function of the position along the optical axis of the GRIN fiber lenses in an expanded beam connection system according to one aspect of the present disclosure and (b) an enlarged portion of the plot in (a).

DETAILED DESCRIPTION

At the connection interface in a detachable connection between two optical fibers, the energy density is desirably reduced to reduce optical power attenuation due to fiber misalignment, dust intrusion and the like. An expanded beam solution is therefore desirable. A lens implemented by a short-length GRIN fiber facilitates expansion of light beam, so that the interface is chosen at the half length (¼-pitch) of the lens. However, when the GRIN is not carefully designed, this solution is prone to material dispersion, i.e., the transmission is wavelength dependent, leading to inefficient coupling for various wavelengths. In addition, the fiber core region typically has germanium doping to increase the refractive index. At high-power UV-wavelengths, the presence of germanium is impermissible. The purpose of certain examples disclosed in the present disclosure is to create a graded index profile through fluorine doping, enabling the connector to operate efficiently at UV-wavelengths. In certain examples, a pure-silica core is used, and the fluorine concentration is tuned such that the system becomes sufficiently wavelength independent for the spectral region of interest.

Figure 1:
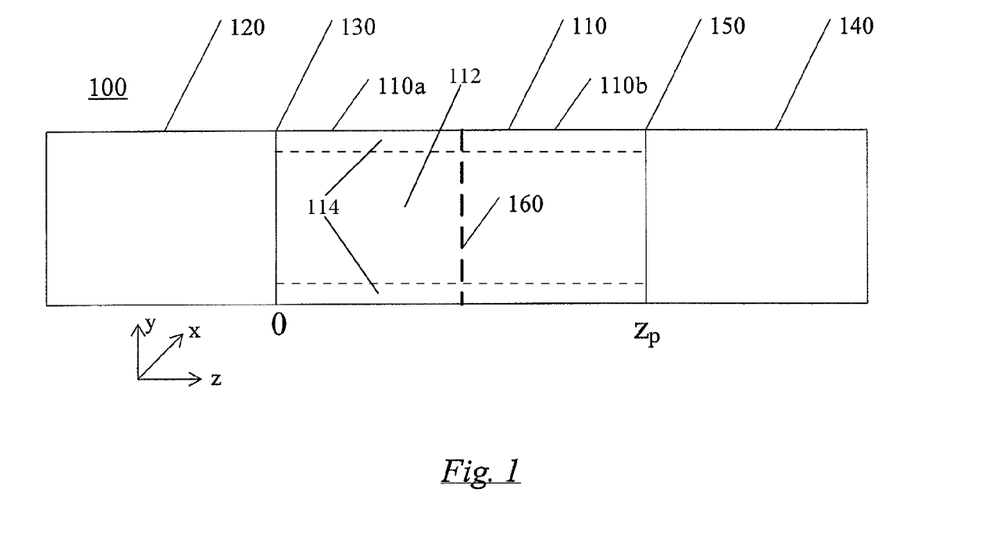
FIG. 1 schematically shows a GRIN connection system according to one aspect of the present disclosure.

An exemplary GRIN fiber lens expanded beam connection system 100 according to one aspect of the present disclosure is schematically shown in FIG. 1. In this configuration, a GRIN fiber lens 110, which can include two separate halves 110a and 110b, with an interface 160, optically connects two optical fibers 120 and 140, at interfaces 130 and 150, respectively. The GRIN fiber lens and optical fibers 120 and 140 in this example are solid cylindrical shaped each having an optical axis aligned along the z-axis. The GRIN fiber lens 110 in this example is made up of two optical fiber segments 110a and 110b of the same diameter as the optical fibers 120 and 140 to which the segments 110a and 110b, respectively, are connected, but may be of other cross-sectional dimensions. Each of the GRIN fiber lens 110a and 110b comprises a core 112 defined along the optical axis and a cladding 114 axially surrounding the core 112. In addition, the interface 160 between the two halves 110a and 110b can be a contact interface between the two halves but may also be an air gap, vacuum gap, or a gap filled with another medium. In the case of an air or vacuum gap, the total length of the lens 110 is the sum of the lengths of the segments 110a and 110b.

The optical fibers 120 and 130 can be any suitable optical fibers, including single-mode optical fibers.

The core of the GRIN fiber lens 110 in this example has a generally parabolic refractive index profile in the x-y plane. That is the refractive index n(r) can be generally expressed as the following function of the distance r in the x-y plane and from the optical axis:

$$n(r) = n_{co}\sqrt{1 - 2\Delta\left(\frac{r}{R}\right)^2},$$

where $n_{co}$ is the core refractive index at the center (i.e., along the optical axis) of the GRIN fiber lens, and $\Delta$ is related to the difference between the refractive index of the core and the cladding. The cladding refractive index, $n_{cl}$, is constant throughout the cladding region and is typically the value of n(r) at the radius, R, of the core.

To achieve the parabolic profile of the refractive index of the core, doping of an element, such as germanium, that raises the refractive index of the host material, such as silica, is typically used. However, germanium is detrimental to the transmission of UV light, which is an important spectral component in certain high-power laser applications. Thus, in certain examples of the GRIN fiber lenses according to the present disclosure, germanium doping is not used. Instead, fluorine is doped in the cladding to lower the refractive index of the cladding. In addition, a parabolic refractive index is created in the core by gradually increasing the fluorine concentration radially away from the center of the core. In the cladding region, the fluorine concentration is kept substantially constant throughout.

The connection system is tuned such that the transmission of light is substantially independent of the wavelength over a desirable range, such as a range of 200 nm, 300 nm or 400 nm. In one example, the connection system is tuned such that the transmission of light is substantially independent of the wavelength over a range of wavelengths from about 405 nm to about 800 nm. In another example, the wavelengths range from about 190 nm to about 390 nm. In a further example, the wavelengths range from about 1270 nm to about 1650 nm.

As used in this application, "substantially independent" means that the half-pitch lengths for the wavelength range (e.g., 405 to and 800 nm) differ by no more than about 1 μm. In one example, the system is tuned, for example by fluorine doping at an appropriate level in the cladding, such that the half-pitch length, $z_p$, is substantially the same for two particular wavelengths in the desired wavelength range. For example, two wavelengths at or near the opposite ends of the desired range can be made substantially the same. As a more specific example, $z_p$ for 405 nm and 800 nm can be made substantially the same for the range from 405 nm to 800 nm.

The connection system can alternatively be tuned to satisfy other conditions. For example, the system can be tuned, for example by fluorine doping, such that the total spread (for example based on the sum of least-squares) of $z_p$ for several selected wavelengths can be minimized.

The following is an outline of an example methodology for achieving a substantially wavelength-independent connection according to an aspect of the present disclosure. The ray half-period for a parabolic profile is (see, e.g., A. W. Snyder, "Optical Waveguide Theory", 1983)

$$\overline{z_p} = \frac{\pi R \overline{\beta}}{n_{co}\sqrt{2\Delta}},$$

where $n_{co}$ is the refractive index at the center of the core, $\overline{\beta}$ is the propagation coefficient.

Consider linearly polarized (LP) modal fields that are associated with an infinite-parabolic refractive index profile. This approximation eases the computation, as the fields are analytically known in terms of Laguerre polynomials. After computing the overlap integral, the total electric field in the GRIN as a sum of all guided modes with their amplitude:

$$E = \sum_{l,m} a_{l,m} E_{l,m} e^{-j\beta(l,m)z}$$

where (l,m) represent the azimuthal and radial index, and where β denotes the propagation coefficient.

Figure 2A:
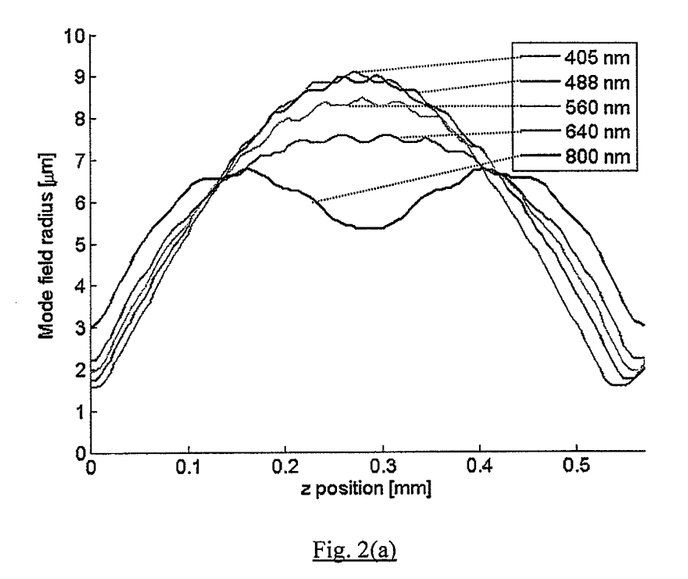
Figure 2B:
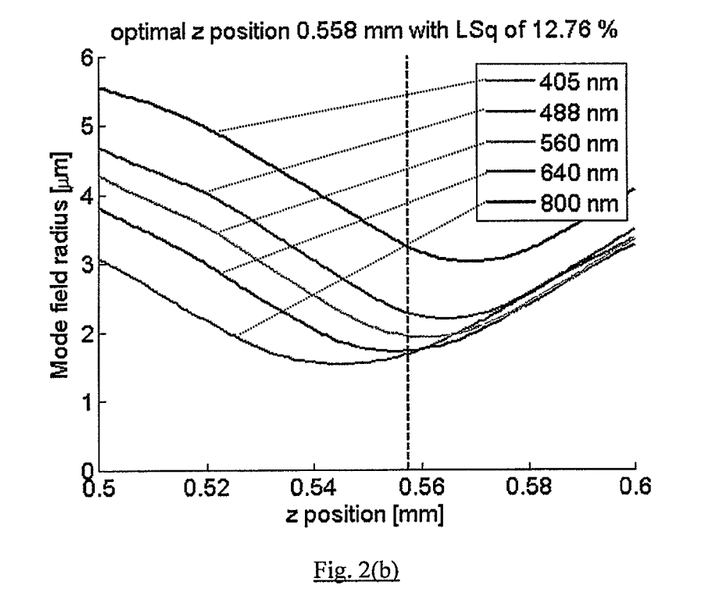

The field expansion is then caused by constructive interference of the modal electromagnetic fields. In FIG. 2(a), the $1/e^2$ beam-width is plotted as a function of the longitudinal coordinate. Note, especially from FIG. 2(b), that the half-pitch length is wavelength dependent. The total length of the GRIN fiber lens may be chosen to minimize the total modal field diameters for various wavelengths. For example, in the case illustrated in FIGS. 2(a) and 2(b), the optimal length of the total GRIN fiber lens 110 is about 0.558 mm.

Figure 3A:
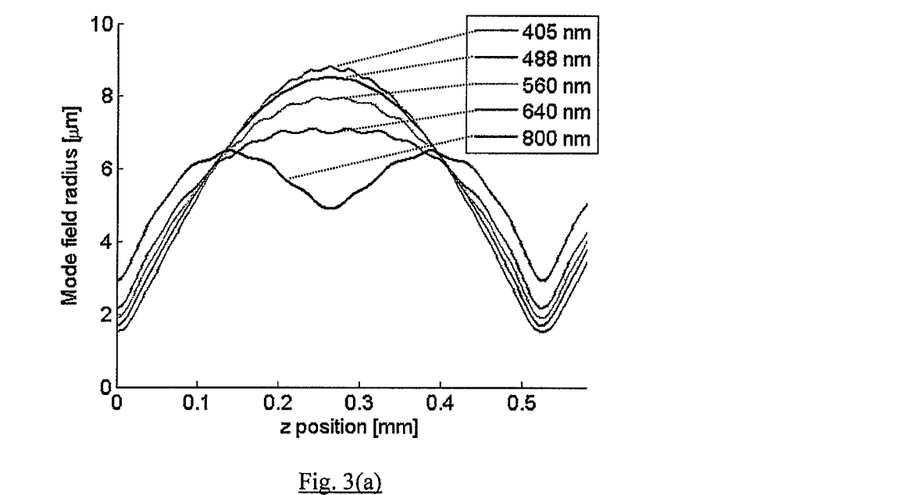
Figure 3B:
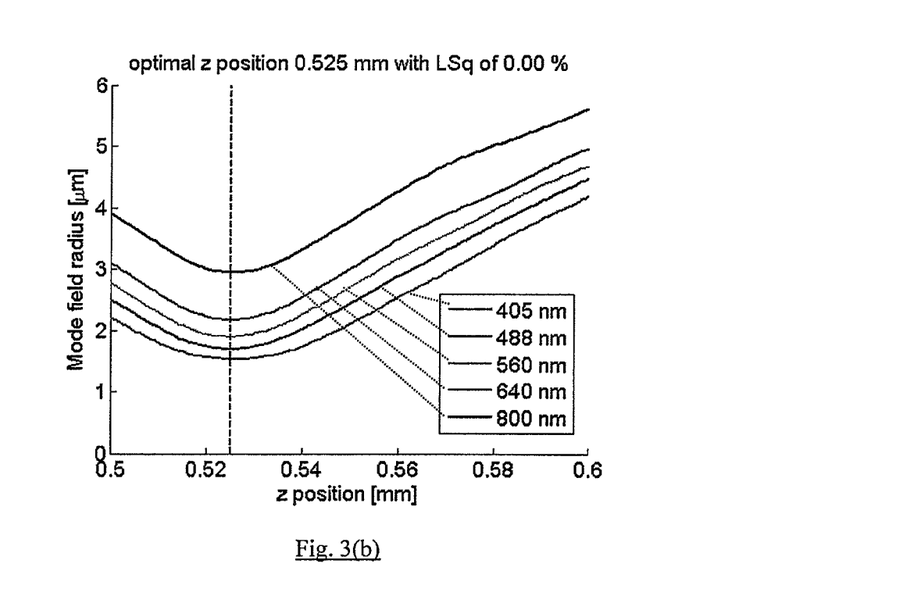

By properly designing the materials parameters, it is possible to achieve a connection system in which the half-pitch length is substantially wavelength-independent, as illustrated in FIGS. 3(a) and 3(b). The following example approach was used to tune the materials properties to achieve such a result.

Approximate modal electromagnetic fields theory is well understood for the given refractive index profile (see, e.g., A. Ghatak and K. Thyagarajan, "An Introduction to Fiber Optics", 1st Ed., Cambridge University Press, 1998). Given the electric and magnetic fields, the intensity distribution is given by $$\underline{S}(x, y, z) = \tfrac{1}{2}\mathrm{Re}\{\underline{E}(x, y, z) \times \underline{H}^*(x, y, z)\}.$$

The z-dependent term reads $$S_z(z) = \mathrm{Re}\left\{\sum_i \exp(2j\beta_i z)\right\} = \sum_i \cos[2\beta_i z].$$

where the propagation coefficient $\beta$ for a parabolic refractive index profile reads $$\beta_i = k_0 n_{core}\sqrt{1 - \frac{2i}{k_0 n_{core}^2 R}\sqrt{n_{core}^2 - n_{cladding}^2}}.$$

Using Taylor expansion, $\beta$ can be approximated by $$\beta_i \approx k_0 n_{core} - i\frac{\sqrt{n_{core}^2 - n_{cladding}^2}}{n_{core} R} = \beta_0 + i\Delta\beta.$$

The propagation coefficients are regularly spaced. Consider the field is propagated a length $z_p$ to where all phase-constituents become a multiple of $2\pi$ with respect to the fundamental mode, i.e., $$\sum_i \cos[2\beta_i z_p] = \sum_i \cos(2(\beta_0 + i\Delta\beta)z_p),$$

where it is required that for the first half-period, $$2\Delta\beta z_p = 2\pi.$$

For the case the phases of the degenerate mode groups interfere constructively, we have deduced a closed-form expression for the half-pitch length $z_p$:

$$z_p = \frac{\pi n_{core} R}{\sqrt{n_{core}^2 - n_{cladding}^2}}.$$

Thus, the length $z_p$ depends on R, as does the beam expansion. Similarly, when considering the geometrical optics approach, one may obtain that the half-pitch length (ray half-period) $\overline{z}_p$ of a parabolic profile is (see, e.g., A. W. Snyder, "Optical Waveguide Theory", 1983)

$$\overline{z}_p = \frac{\pi R \overline{\beta}}{n_{co}\sqrt{2\Delta}},$$

where $n_{co}$ is the refractive index at the center of the core, $\overline{\beta}$ is the ray-invariant which behaves similar to the propagation coefficient, R is the radius of the core and $\Delta$ is related to the difference between the refractive indexes of the core and cladding. Note that $$z_p = \overline{z}_p\big|_{\overline{\beta}=n_{co}},$$

i.e., the expression for the half-pitch is similar to the half-pitch length.

In view of the wavelength-dependent refractive index profile, the fluorine concentration in the cladding may be chosen such that the numerator and denominator of $z_p$ vary similarly. If we then describe the wavelength dependency of the core and cladding refractive index for example with the Sellmeier equation, we can formulate a minimization problem with the fluorine concentration (XF) as the unknown parameter. For example, the fluorine concentration (XF) may be chosen such that for the wavelengths 405 nm and 800 nm, $$n_{core}^2(\lambda_2) - n_{core}^2(\lambda_1) + \sum_{i=1}^{3}\left[\frac{n_{core}^2(\lambda_2)b_i(XF)\lambda_1^2}{\lambda_1^2 - \lambda_i^2(XF)} - \frac{n_{core}^2(\lambda_1)b_i(XF)\lambda_2^2}{\lambda_2^2 - \lambda_i^2(XF)}\right] = 0$$

Figure 4:
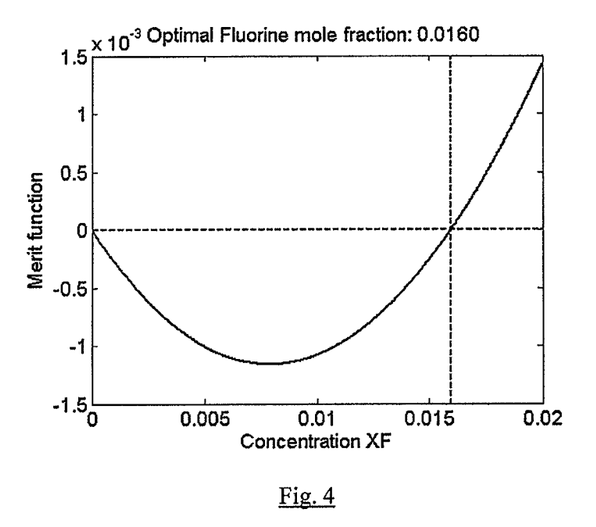
FIG. 4 graphically shows a numeric solution for optimal fluorine doping level in the cladding of the GRIN fiber lens according to one aspect of the present disclosure.
Figure 5:
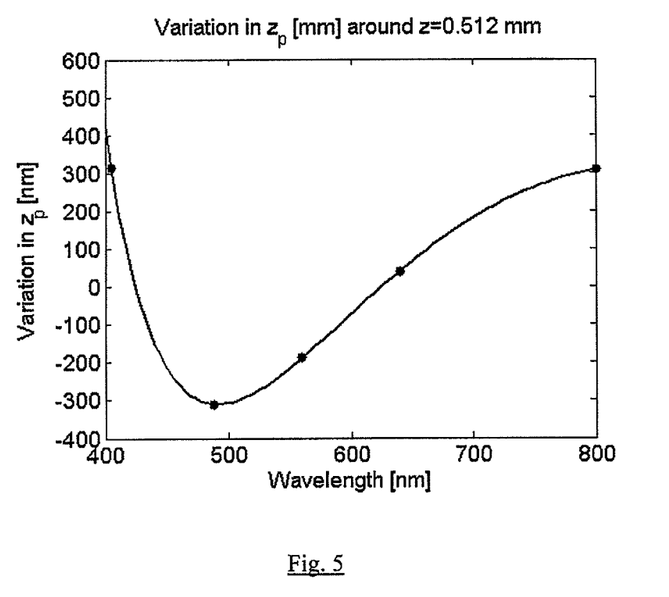
FIG. 5 shows a plot of the mismatch of the half-pitch length, $Z_p$, as a function of wavelength for an optimized GRIN fiber lens according to an aspect of the present disclosure.

A solution for this equation can be readily obtained, as shown in FIG. 4. In that particular example, the optimal mole fraction of fluorine is about 0.016. The resulting fiber is not wavelength-independent across the entire spectrum, as shown in FIG. 5. However, it is substantially independent for the region of interest, as the data summarized below demonstrate:

| Radius R [μm] | Mean $z_p$ [mm] | Variation [μm] |
| --- | --- | --- |
| 25 | 0.512 | +/−0.3 |
| 31.25 | 0.640 | +/−0.4 |
| 40 | 0.819 | +/−0.5 |

Given the optimal fluorine concentration in the cladding, the total length of the GRIN fiber lens can be readily obtained by the least-squares calculations for the $z_p$ for the various wavelengths in the wavelength range. For the example in FIG. 3, the optical lens length is about 0.525 mm.

EXAMPLES

Once the cladding concentration has been fixed (and thus the NA), increasing the radius R increases $z_p$, but also the beam expansion. Examples of MFR profiles and other date for GRIN fiber lenses with optimal fluorine doping discusses above are given in the following examples.

Example 1

Figure 6:
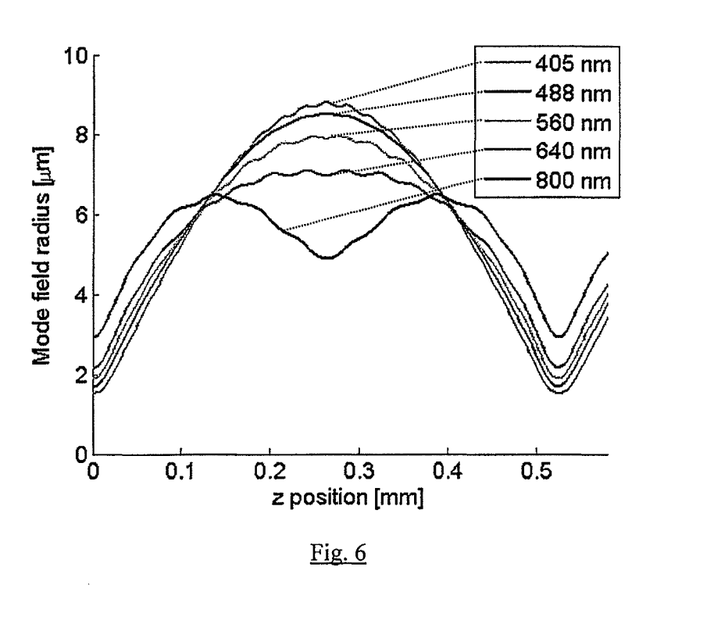
FIG. 6 shows a plot of mode field radius as a function of the position along the optical axis of the GRIN fiber lenses in an expanded beam connection system with a 50 µm core diameter according to one aspect of the present disclosure.

The MFRs as a function of z-position for different wavelengths for R=50 μm are plotted in FIG. 6. Certain related data are shown in the table below:

| λ [nm] | MFD(0) [μm] | MFD($z_p$/2) [μm] | Expansion factor |
| --- | --- | --- | --- |
| 405 | 3 | 16.9 | 5.5 |
| 488 | 3.4 | 16.5 | 4.9 |
| 560 | 3.8 | 15.4 | 4.1 |

-continued

| λ [nm] | MFD(0) [µm] | MFD($z_p$/2) [µm] | Expansion factor |
|---|---|---|---|
| 640 | 4.3 | 13.7 | 3.2 |
| 800 | 5.8 | 9.5 | 1.7 |

Figure 10:
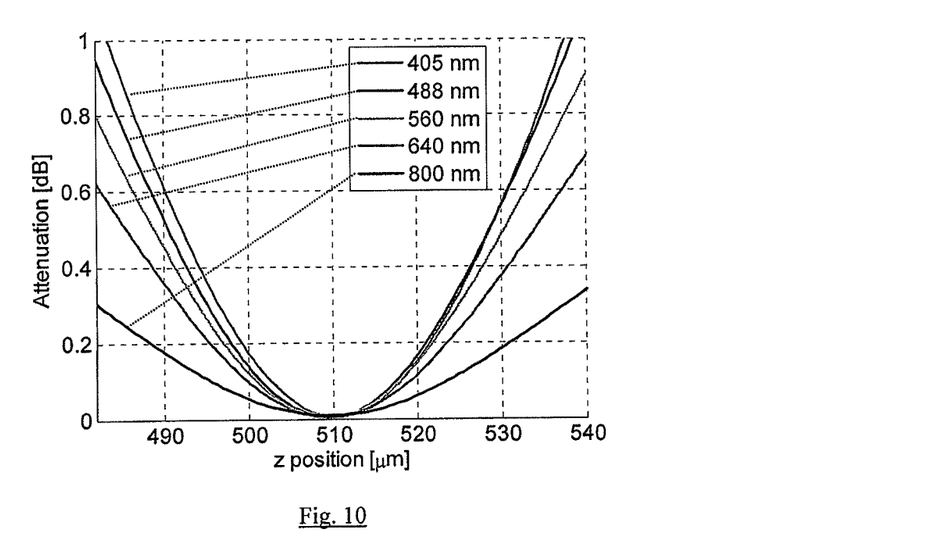
FIG. 10 shows signal attenuation as a function of total length of the GRIN fiber lenses in an expanded beam connection system with a 50 µm core diameter according to one aspect of the present disclosure.

The sensitivity to the total lens length, expressed in terms of power attenuation as a function of z-position, for the various wavelengths, is shown in FIG. 10. It is seen from FIG. 10 that to remain below 0.2 dB attenuation, the tolerance on the length is about 10 µm.

Example 2

Figure 7:
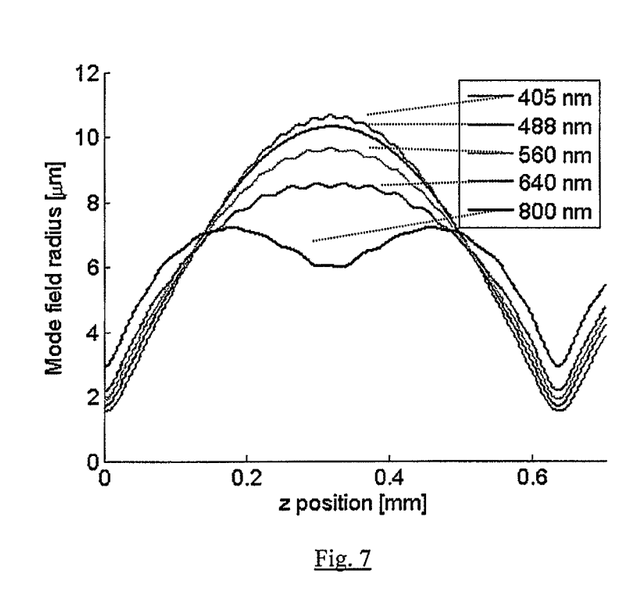
FIG. 7 shows a plot of mode field radius as a function of the position along the optical axis of the GRIN fiber lenses in an expanded beam connection system with a 62.5 µm core diameter according to one aspect of the present disclosure.

The MFRs as a function of z-position for different wavelengths for R=62.5 µm are plotted in FIG. 7. Certain related data are shown in the table below:

| λ [nm] | MFD(0) [µm] | MFD($z_p$/2) [µm] | Expansion factor |
|---|---|---|---|
| 405 | 3 | 21.3 | 7 |
| 488 | 3.4 | 20.6 | 6.1 |
| 560 | 3.8 | 19.3 | 5.1 |
| 640 | 4.3 | 16.9 | 4 |
| 800 | 5.8 | 12 | 2.1 |

Figure 11:
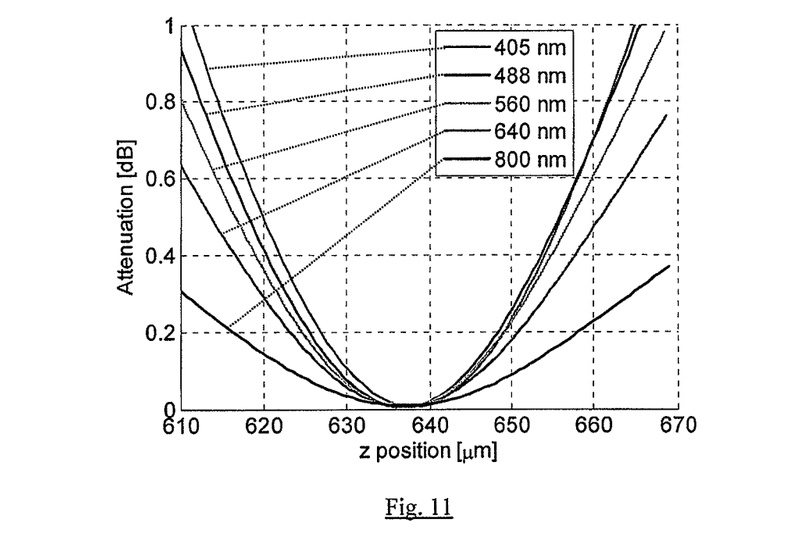
FIG. 11 shows signal attenuation as a function of total length of the GRIN fiber lenses in an expanded beam connection system with a 62.5 µm core diameter according to one aspect of the present disclosure.

The sensitivity to the total lens length, expressed in terms of power attenuation as a function of z-position, for the various wavelengths, is shown in FIG. 11. It is seen from FIG. 11 that to remain below 0.2 dB attenuation, the tolerance on the length remains about 10 µm.

Example 3

Figure 8:
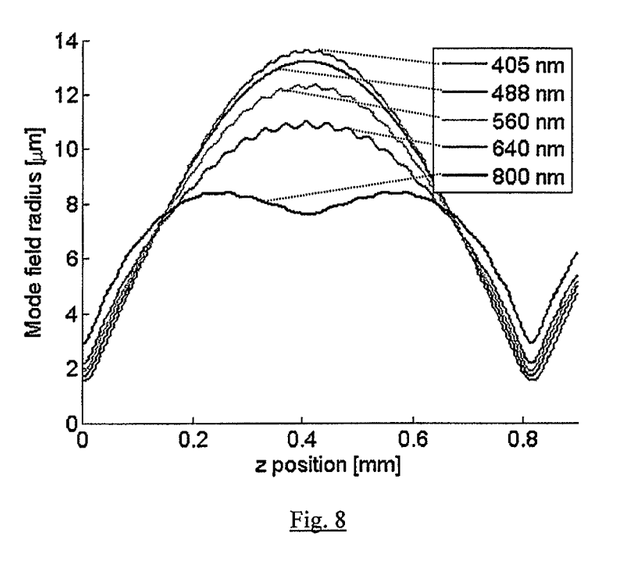
FIG. 8 shows a plot of mode field radius as a function of the position along the optical axis of the GRIN fiber lenses in an expanded beam connection system with a 80 µm core diameter according to one aspect of the present disclosure.

The MFRs as a function of z-position for different wavelengths for R=80 µm are plotted in FIG. 8. Certain related data are shown in the table below:

| λ [nm] | MFD(0) [µm] | MFD($z_p$/2) [µm] | Expansion factor |
|---|---|---|---|
| 405 | 3 | 27.3 | 8.9 |
| 488 | 3.4 | 26.4 | 7.8 |
| 560 | 3.8 | 24.5 | 6.5 |
| 640 | 4.3 | 22 | 5.1 |
| 800 | 5.8 | 15.3 | 2.6 |

Figure 12:
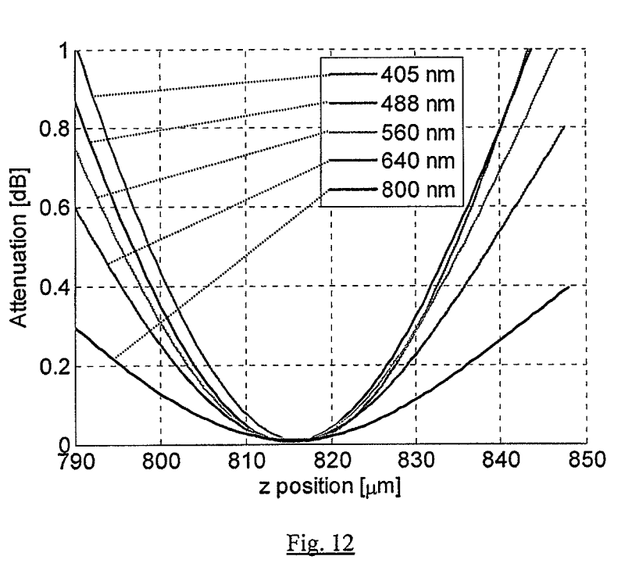
FIG. 12 shows signal attenuation as a function of total length of the GRIN fiber lenses in an expanded beam connection system with a 80 µm core diameter according to one aspect of the present disclosure.

The sensitivity to the total lens length, expressed in terms of power attenuation as a function of z-position, for the various wavelengths, is shown in FIG. 12. It is seen from FIG. 12 that to remain below 0.2 dB attenuation, the tolerance on the length remains about 10 µm.

Example 4

Figure 9:
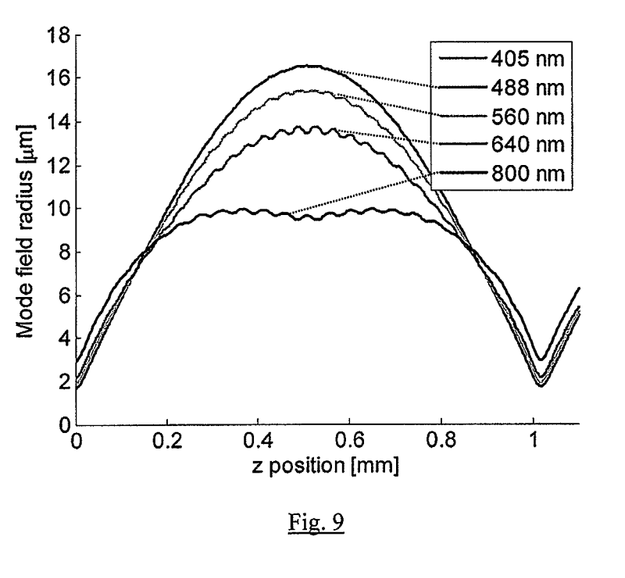
FIG. 9 shows a plot of mode field radius as a function of the position along the optical axis of the GRIN fiber lenses in an expanded beam connection system with a 100 µm core diameter according to one aspect of the present disclosure.

The MFRs as a function of z-position for different wavelengths for R=100 µm are plotted in FIG. 9. Certain related data are shown in the table below:

| λ [nm] | MFD(0) [µm] | MFD($z_p$/2) [µm] | Expansion factor |
|---|---|---|---|
| 405 | 3 | — | — |
| 488 | 3.4 | 26.4 | 9.7 |
| 560 | 3.8 | 24.5 | 8.1 |
| 640 | 4.3 | 22 | 6.3 |
| 800 | 5.8 | 15.3 | 3.3 |

Figure 13:
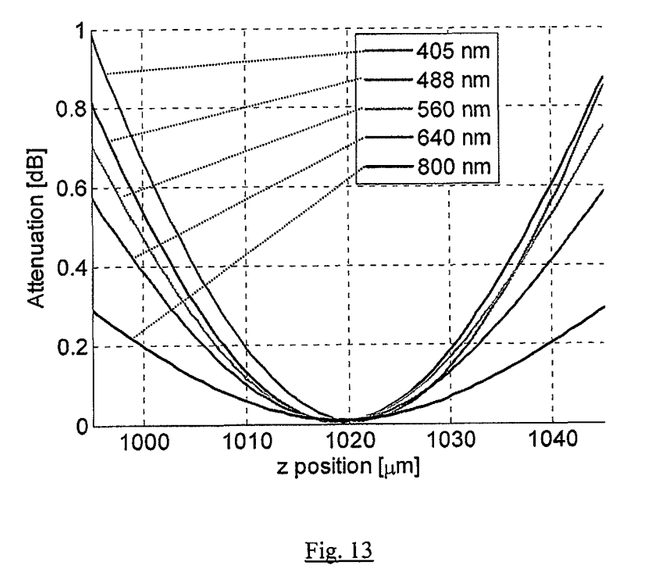
FIG. 13 shows signal attenuation as a function of total length of the GRIN fiber lenses in an expanded beam connection system with a 100 µm core diameter according to one aspect of the present disclosure.

The sensitivity to the total lens length, expressed in terms of power attenuation as a function of z-position, for the various wavelengths, is shown in FIG. 13. It is seen from FIG. 13 that to remain below 0.2 dB attenuation, the tolerance on the length remains about 10 µm.

Thus, a substantially wavelength-independent GRIN fiber lens connection has been achieved according to the present disclosure. Because many embodiments of the invention can be made without departing from the spirit and scope of the invention, the invention resides in the claims hereinafter appended.

The invention claimed is:

1. An optical coupling system for optically connecting two optical fibers, the system comprising a graded-index ("GRIN") fiber lens defining an optical axis and two ends disposed apart along the optical axis,
    the GRIN fiber lens being optically connectable to two optical fibers, each at a respective one of the two ends,
    the GRIN fiber lens having a half-pitch length that differs by no more than 1 µm over a wavelength range of at least about 200 nm,
    the GRIN fiber lens further defining a total lens length of an integer multiple of the half-pitch length along the optical axis and
    the GRIN fiber lens comprises a core defined along the optical axis and a cladding axially surrounding the core, the cladding having a lower refractive index than pure silica over the wavelength range.

2. The optical coupling system of claim 1, wherein the cladding is doped with fluorine.

3. The optical coupling system of claim 2, wherein cladding contains 0.016 mole fraction of fluorine.

4. The optical coupling system of claim 2, wherein the core of the GRIN fiber lens is doped with flourine, wherein concentration of flourine gradually increases radially away from the center of the core.

5. The optical coupling system of claim 1, wherein the GRIN fiber lens is free of Germanium.

6. The optical coupling system of claim 1, wherein the total lens length of the GRIN fiber lens is one half-pitch length.

7. The optical coupling system of claim 1, wherein the wavelength range is at least about 300 nm.

8. The optical coupling system of any of claim 7, wherein the wavelength range of at least 400 nm.

9. The optical coupling system of any of claim 8, wherein the range of wavelengths cover at least from 405 nm to about 800 nm.

10. The optical coupling system of claim 1 wherein the half-pitch lengths for two wavelengths differ by no more than 100 nm.

11. The optical coupling system of claim 10, wherein the half-pitch lengths for 405 nm and 800 nm differ by no more than 1 µm.

12. The optical coupling system of claim 1, wherein the GRIN fiber lens comprises two lens portions separated by an interface therebetween.

13. An optical system, comprising:
    an optical coupling system of claim 1, and
    two optical fibers, each defining an end, the end of each optical fiber being interfaced with a respective one of the two ends of the GRIN fiber lens.

14. The optical system of claim 13, wherein the two optical fibers are single-mode fibers.

15. The optical system of claim 13, wherein the end of each optical fiber being interfaced with a respective one of the two ends of the GRIN fiber lens via a contact interface.

16. The optical system of claim 15, wherein the cladding contains flourine.

17. The optical system of claim 16, wherein the two optical fibers are single-mode fibers.

18. The optical system of claim 16, wherein the GRIN fiber lens is free of Germanium.

19. The optical coupling system of claim 1, wherein the cladding is doped with an element that lowers the refractive index of the cladding.

20. The optical coupling system of claim 19, wherein the core of the GRIN fiber lens is doped with the element that lowers the refractive index of the cladding, wherein concentration of the element gradually increases radially away from the center of the core.

* * * * *

UNITED STATES PATENT AND TRADEMARK OFFICE
CERTIFICATE OF CORRECTION

PATENT NO. : 9,823,421 B2  
APPLICATION NO. : 13/826473  
DATED : November 21, 2017  
INVENTOR(S) : Floris et al.

Page 1 of 1

It is certified that error appears in the above-identified patent and that said Letters Patent is hereby corrected as shown below:

In the Claims

Column 8, Line 47, Claim 9: "wavelengths cover at least" should read --wavelengths covers at least--

Signed and Sealed this
Twenty-first Day of May, 2019

Andrei Iancu
*Director of the United States Patent and Trademark Office*